(12) United States Patent
Vaidya et al.

(10) Patent No.: US 11,665,528 B2
(45) Date of Patent: May 30, 2023

(54) CBRS PAL/GAA CHANNEL REASSIGNMENT

(71) Applicant: Charter Communications Operating, LLC, St. Louis, MO (US)

(72) Inventors: Maulik Vaidya, Palmdale, CA (US); Abdulrauf Hafeez, Cary, NC (US); Panayiotis Papadimitriou, Hayward, CA (US); Dumitru Ionescu, Poway, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/175,615

(22) Filed: Feb. 13, 2021

(65) Prior Publication Data
US 2022/0264287 A1 Aug. 18, 2022

(51) Int. Cl.
*H04W 8/24* (2009.01)
*H04W 88/08* (2009.01)
(Continued)

(52) U.S. Cl.
CPC ............ *H04W 8/24* (2013.01); *H04L 67/145* (2013.01); *H04W 36/06* (2013.01); *H04W 72/0453* (2013.01); *H04W 88/08* (2013.01)

(58) Field of Classification Search
CPC ... H04W 8/24; H04W 36/06; H04W 72/0453; H04W 88/08; H04W 16/04; H04W 16/14; H04L 67/145
See application file for complete search history.

(56) References Cited

U.S. PATENT DOCUMENTS

| 2015/0257053 A1* | 9/2015 | Zeng ............... H04W 36/00837 455/436 |
| 2015/0257188 A1* | 9/2015 | Patil ........................ H04W 4/08 455/41.1 |
| 2019/0364565 A1* | 11/2019 | Hmimy ............. H04W 72/0453 |

OTHER PUBLICATIONS

WINNF-TS-3002, "Signaling Protocols and Procedures for Citizens Broadband Radio Service (CBRS): Extensions to Spectrum Access System (SAS)—Citizens Broadband Radio Service Device (CBSD) Interface Technical Specification (Release 2)." Version V1.1.0, Sep. 30, 2020 (49 pages).

(Continued)

*Primary Examiner* — Mandish K Randhawa
(74) *Attorney, Agent, or Firm* — Mendelsohn Dunleavy, P.C.; Steve Mendelsohn

(57) ABSTRACT

In certain embodiments, a (CBSD) base station for a (CBRS) radio system transmits new information elements in an existing capability exchange message to a spectrum access system (SAS) informing the SAS as to whether the SAS should transmit a channel-change message to the base station either (i) directly (and despite of domain proxy being present in the communication path) or (ii) via a domain proxy. If and when the SAS subsequently receives notification of incumbent activity from an Environmental Sensing Capability system, the SAS transmits either a new channel-change message or includes new information elements in an existing heartbeat message to the base station either (i) directly or (ii) via the domain proxy per the capability exchange message. The SAS can combine multiple channel-change messages for multiple base stations into a single message for transmission to a domain proxy that can communicate with those multiple base stations, thereby reducing communications to and from the SAS and decreasing the time that it takes to change channels without jeopardizing existing traffic.

24 Claims, 4 Drawing Sheets

(51) Int. Cl.
*H04W 36/06* (2009.01)
*H04L 67/145* (2022.01)
*H04W 72/0453* (2023.01)

(56) References Cited

OTHER PUBLICATIONS

WINNF-TS-0016, "Signaling Protocols and Procedures for Citizens Broadband Radio Service (CBRS): Spectrum Access System (SAS)—Citizens Broadband Radio Service Device (CBSD) Interface Technical Specification." Version V1.2.6, Nov. 25, 2020 (52 pages).
WINNF-TS-0112, "Requirements for Commercial Operation in the U.S. 3550-3700 MHz Citizens Broadband Radio Service Band." Version V1.9.1, Mar. 11, 2020 (76 pages).
3GPP TS 37.340, "3rd Generation Partnership Project; Technical Specification Group Radio Access Network; Evolved Universal Terrestrial Radio Access (E-UTRA) and NR; Multi-connectivity; Stage 2." Version V16.3.0, Sep. 2020 (83 pages).
3GPP TS 38.331, "3rd Generation Partnership Project; Technical Specification Group Radio Access Network; NR; Radio Resource Control (RRC) protocol specification." Version V16.2.0, Sep. 2020 (921 pages).
3GPP TS 38.423, "3rd Generation Partnership Project; Technical Specification Group Radio Access Network; NG-RAN; Xn application protocol (XnAP)." Version V16.3.0, Sep. 2020 (451 pages).

\* cited by examiner

FIG. 5

| NAME: *palchannelreassigned*<br>DATA TYPE: Boolean | REG-CONDITIONAL | "true" if for a given PAL channel a different channel is to be assigned<br>"false" if for a given PAL channel no alternative channel was found |
| --- | --- | --- |
| NAME: *PalChannelToBeReassigned*<br>DATA TYPE: object:<br>FrequencyRange | REG-CONDITIONAL | Include if *palchannelreassigned* is "true" *(IE definition is from [6])*. Multiple instances of this object can be present. |
| NAME: *PalChannelToUse*<br>DATA TYPE: object:<br>FrequencyRange | REG-CONDITIONAL | Include if *palchannelreassigned* is "true" *(IE definition is from [6])* and *PalChannelToBeReassigned* is included. Multiple instances of this object can be present. |

CBRS PAL/GAA CHANNEL REASSIGNMENT

BACKGROUND

Field of the Disclosure

The present disclosure relates to telecommunications and, more specifically but not exclusively, to spectrum management in radio networks such as 4G or 5G radio networks.

Description of the Related Art

This section introduces aspects that may help facilitate a better understanding of the disclosure. Accordingly, the statements of this section are to be read in this light and are not to be understood as admissions about what is prior art or what is not prior art.

In conventional 4G or 5G radio networks, a Spectrum Access System (SAS) is responsible for controlling the allocation to base stations of channels within the 150-MHz Citizens Broadband Radio Service (CBRS) spectrum of the 3.5-GHz frequency band. In particular, a SAS is responsible for allocating some or all of the CBRS spectrum to individual CBRS base stations (CBSDs) within the SAS's coverage region, with each CBSD in turn allocating some or all of its allocated channels to the individual user equipments (UEs) within its local coverage area, all in ways that limit interference between different CBRS spectrum users.

There are three different classes of users of the CBRS spectrum: General Authorized Access (GAA) users, Priority Access License (PAL) users, and incumbent users (e.g., U.S. government entities such as the military). A grant of PAL license(s) to an operator affords the operator protection from interference generated by GAA users within a given geographical area, such as a county, as long as the PAL licensee operates per FCC Part 96 rules in one or more PAL channels in the lower 100 MHz of the CBRS spectrum as assigned to the licensee's CBSDs by the SAS.

Regardless of the assigned PAL channel(s), a PAL licensee is always required to protect incumbent users at all times. In a situation where an incumbent activity is detected (e.g., a U.S. military vessel approaching the shoreline), any of the PAL licensee's CBSDs operating in certain PAL channel(s) must vacate those channel(s) as indicated by the SAS. In such an event, the SAS relocates spectrum previously assigned to the PAL licensee's CBSDs per a "move-list." The CBSDs with channel grants on the "move-list" may be provided alternative channel(s) to continue operations (i.e., wireless communication traffic with its UE customers).

In a typical situation, a PAL licensee that operates a number of different CBSDs in the geographical area covered by the PAL license will be awarded access to one or more PAL channels, where the SAS will assign one or more of those PAL channels to the PAL licensee's CBSDs, as needed. Note that not every one of the PAL licensee's CBSDs will necessarily be assigned a PAL channel. The remaining non-PAL portions of the CBRS spectrum (referred to herein as "GAA channels") are then available to be allocated by the SAS to the PAL licensee as well as to other, unlicensed, GAA operators of CBSDs in that same geographical area.

In this typical situation, it is assumed that there are no permanent incumbent users in the geographical area. However, if and when an incumbent user, such as a U.S. military vessel, enters the geographical area, the SAS will send a move-list to all of the CBSDs of the PAL licensee to move their UE traffic to other (e.g., GAA) channels. Note that the SAS will send the move-list even to those CBSDs of the PAL licensee that are not assigned any PAL channels even though they have no PAL traffic to be moved to GAA channels. When there are a significant number of PAL CBSDs supporting a significant number of UEs, the communications between the SAS and the PAL licensee's CBSDs and the resulting moves from the PAL channels to the GAA channels can take a significant amount of time, during which the incumbent user might not be able to fully access the PAL channels as needed. Alternatively, if the incumbent user is granted full access to the PAL channels too quickly, then there may be disruptions to the communications of the PAL licensee's customers. Moving CBSDs from and back to their assigned PAL channel(s) where they have ongoing commercial service operations may prove disastrous (including service disruptions to end users) if not managed property.

SUMMARY

According to certain embodiments of the present disclosure, each CBSD of a PAL licensee that is allocated one or more PAL channels pre-registers with the SAS to inform the SAS how the CBSD wants to be sent a move-list upon the arrival of an incumbent. As part of the capability exchange process, each such CBSD will instruct the SAS whether the SAS should send the CBSD a move-list either directly or via a domain proxy in the radio system. Note that those CBSDs of the PAL licensee that have not been allocated any PAL channels will not need to pre-register with the SAS.

As such, if and when an incumbent arrives and the SAS needs to move PAL-channel users to GAA channels, the SAS will need to send the move-list to only the subset of the PAL licensee's CBSDs that have pre-registered with the SAS. Furthermore, if two or more CBSDs request to receive the move-list via the same domain proxy, then the SAS can send a single, combined message to that domain proxy, which will then send individual messages to those different CBSDs. In these ways, the communications from and to the SAS may be reduced, thereby reducing the time that it takes to move the PAL-channel users to GAA channels without risking loss of communications for any of the PAL licensee's customers.

As understood by those skilled in the art, by an independent process, a CBSD may be configured to communicate with a SAS via another CBSD whether or not those communications also involve a domain proxy. Thus, depending on how a particular CBSD is otherwise configured, when communications between a SAS and that particular CBSD involve a domain proxy, those communications may include either (i) direct communications between the domain proxy and that particular CBSD or (ii) indirect communications between the domain proxy and that particular CBSD via another CBSD. Similarly, when communications between a SAS and a particular CBSD do not involve a domain proxy, those communications may be either (i) direct communications between the SAS and that particular CBSD or (ii) indirect communications between the SAS and that particular CBSD via another CBSD. As used herein, communications between a SAS and a particular CBSD that involve a domain proxy are referred to as being "via" the domain proxy, whether or not they involve another CBSD, and communications between a SAS and a particular CBSD that do not involve a domain proxy are referred to as being "direct" communications, whether or not they involve another CBSD. Thus, for example, when the transmission of a move-list from a SAS for a particular CBSD involves a domain proxy, that move-list is said to be transmitted "via" the domain proxy, whether or not that transmission involves another domain proxy. And when the transmission of a move-list from a SAS for a particular CBSD does not involve a domain proxy, that move-list is said to be transmitted "directly" to that particular CBSD, again whether or not that transmission involves another CBSD.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 5 shows the information elements (IEs) proposed for addition in the Heartbeat Response object.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Requirements for 5G radio networks are specified in the following specifications, which are incorporated herein by reference in their entirety:

[1] WINNF-TS-3002, "Signaling Protocols and Procedures for Citizens Broadband Radio Service (CBRS): Extensions to Spectrum Access System (SAS)—SAS Interface Technical Specification (Release 2)," V1.1.0, Sep. 30, 2019;

[2] 3GPP TS 38.331, "NR; Radio Resource Control (RRC); Protocol specification," V16.2.0, Oct. 7, 2020;

[3] 3GPP TS 37.370, "NR; Multi-connectivity; Overall description; Stage-2," V16.3.0, Oct. 2, 2020;

[4] 3GPP TS 38.423, "NG-RAN; Xn Application Protocol (XnAP)," V16.3.0, Oct. 2, 2020;

[5] WINNF-TS-0112, "Requirements for Commercial Operation in the U.S. 3550-3700 MHz Citizens Broadband Radio Service Band," v1.9.1, Mar. 11, 2019; and

[6] WINNF-TS-0016, "Signaling Protocols and Procedures for Citizens Broadband Radio Service (CBRS): Spectrum Access System (SAS)—Citizens Broadband Radio Service Device (CBSD) Interface Technical Specification," V1.2.6, Nov. 25, 2020.

Figure 1:
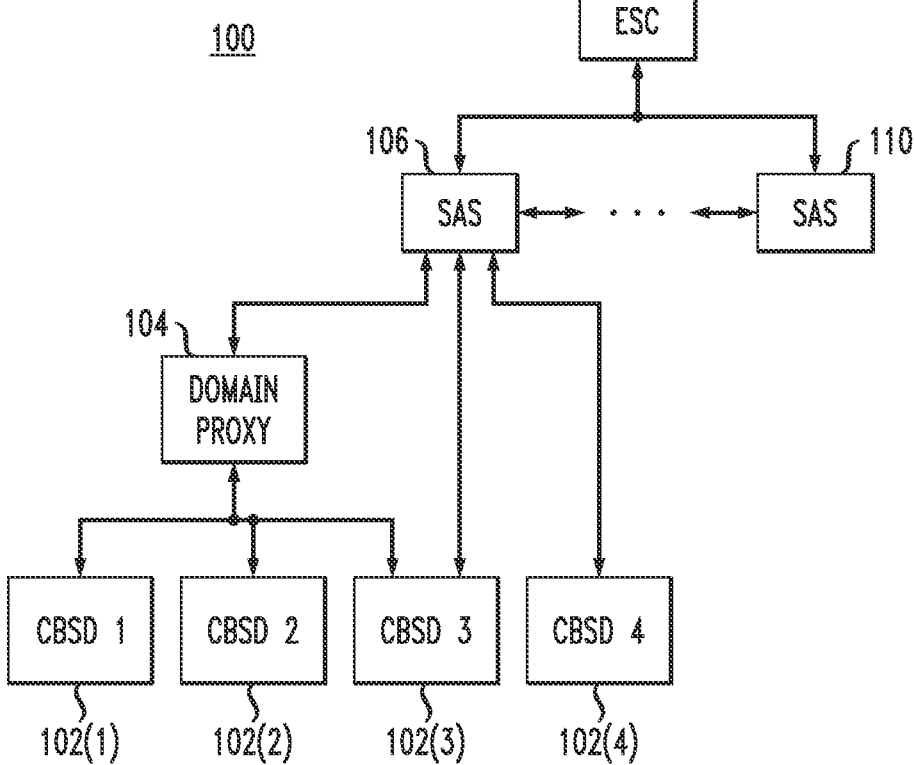
FIG. 1 is a simplified block diagram showing a portion of a CBRS radio system operated by a PAL licensee within the corresponding licensed geographical area, according to one possible embodiment of the disclosure.

FIG. 1 is a simplified block diagram showing a portion of a CBRS radio system 100 operated by a PAL licensee within the corresponding licensed geographical area, according to one possible embodiment of the disclosure. As shown in FIG. 1, the radio system 100 has four different CBSDs 102(1)-102(4) that communicate with a SAS 106, where the CBSDs 102(1)-102(2) communicate with the SAS 106 via a domain proxy 104, the CBSD 102(4) communicates directly with the SAS 106, and CBSD 102(3) can communicate with the SAS 106 either directly or via the domain proxy 104. Also connected to the SAS 106 is an Environmental Sensing Capability (ESC) system 108 that performs incumbent detection and informs the SAS 106 when an incumbent is detected. As shown in FIG. 1, the ESC 108 performs a similar function for one or more other SASs 110 that communicate with the SAS 106 and are responsible for assigning the CBRS spectrum to CBSDs (not shown) in other geographical areas. Although not explicitly shown in FIG. 1, each CBDS 102 can service one or more wireless UEs.

A domain proxy is an optional entity that engages in communication with a SAS on behalf of individual or multiple CBSDs. Clause 7 of WINNF-TS-0112 explains the functional requirements of domain proxies as set forth by the Wireless Innovation Forum (WINNF).

Those skilled in the art will understand that FIG. 1 represents a very basic CBRS radio system. In general, such radio systems may have any suitable number of CBSDs and one or more domain proxies, where each CBSD may communicate with the SAS either directly or via one or more of the domain proxies.

Figure 2:
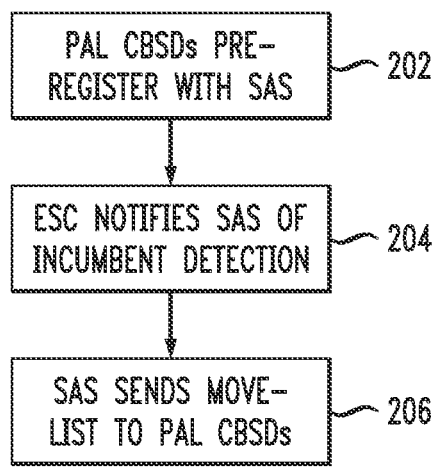
FIG. 2 is a high-level flow diagram of the processing in the radio system of FIG. 1 associated with moving PAL-channel-assigned CBSDs from their PAL channels to GAA channels upon the arrival of an incumbent user.

FIG. 2 is a high-level flow diagram of the processing in the radio system 100 of FIG. 1 associated with moving PAL-channel-assigned CBSDs from their PAL channels to GAA channels upon the arrival of an incumbent user. In Step 202, each CBSD 102 that is assigned at least one PAL channel pre-registers with the SAS 106, including specifying whether the SAS 106 should send the CBSD 102 a move-list either directly or via the domain proxy 104.

In one possible scenario, CBSDs 102(1), 102(3), and 102(4) are each assigned at least one PAL channel, but CBSD 102(2) is not assigned any PAL channels. In that case, each of CBSDs 102(1), 102(3), and 102(4) will pre-register with the SAS in Step 202, but CBSD 102(2) will not. Assume further that, during the pre-registration processing:

CBSD 102(1) instructs the SAS 106 to send any future move-list via the domain proxy 104;

CBSD 102(3) instructs the SAS 106 to send any future move-list via the domain proxy 104; and CBSD 102(4) instructs the SAS 106 to send any future move-list directly (i.e., without going through the domain proxy 104).

Note that, in some implementations, the pre-registration communications between each affected CBSD 102 and the SAS 106 may be direct or via the domain proxy 104 independent of whether the SAS 106 will be sending move-lists to that CBSD 102 directly or via the domain proxy 104. In other implementations, if a CBSD 102 initiates the pre-registration process towards the SAS 106 via a domain proxy, such as the domain proxy 104, then a connection stickiness is assumed whereby subsequent requests/responses involving that CBSD 102, including move-lists, will traverse through that domain proxy. Analogously, if the CBSD 102 initiates the pre-registration process towards the SAS 106 directly, then a connection stickiness is again assumed whereby subsequent requests/responses involving that CBSD 102, including move-lists, will be sent directly between the SAS 106 and the CBSD 102. In such an implementation, the domain proxy 104 no longer serves as a simple passthrough entity.

Referring again to FIG. 2, if and when the ESC 108 detects the arrival of an incumbent, the ESC 108 will notify the SAS 106 in Step 204, and, in response, in Step 206, the SAS 106 will transmit an appropriate move-list to each registered CBSD 102, either directly or via the domain proxy 104 according to the CBSD's pre-registration instruction. In the possible scenario described above, in conformance with instructions received during the pre-registration processing of Step 202, the SAS 106 will (i) transmit the move-list directly to CBSD 102(4) and (ii) transmit the move-list in a single combined message to the domain proxy 104, which will then transmit the move-list to CBSD 102(1) and CBSD 102(3) in individual messages. Note that the SAS 106 will not send the move-list to CBSD 102(2) since it did not pre-register with the SAS 106 in Step 202.

Although not explicitly shown in FIG. 2, if and when the incumbent leaves the area, the ESC 108 will notify the SAS 106, which may then send the CBSDs 102 appropriate move-lists to return their traffic to specified PAL channels. Note that, since there is no specific urgency to these channel moves, the instructions from the SAS 106 to the affected CBSDs 102 can be spread out over time to avoid communication congestion to and from the SAS 106.

Figure 3:
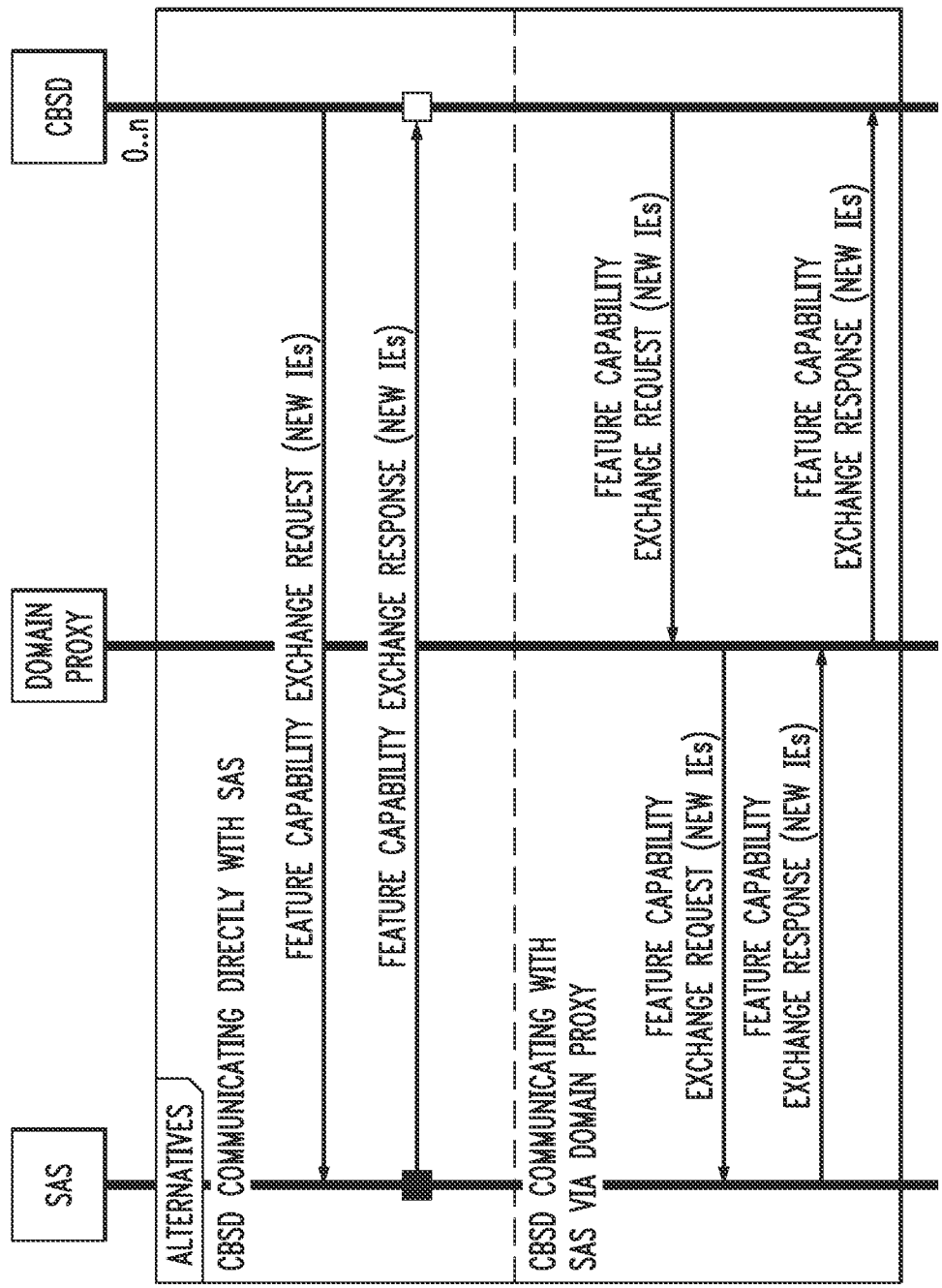
FIG. 3 shows two signal flow diagrams representing two different sequences of communications that can occur during the pre-registration processing of Step 202 of FIG. 2 for one CBSD of FIG. 1.

FIG. 3 shows two signal flow diagrams representing two different sequences of communications that can occur during the pre-registration processing of Step 202 of FIG. 2 for one CBSD 102 of FIG. 1. The sequence at the top of FIG. 3 corresponds to the CBSD 102 communicating directly with the SAS 106, while the sequence at the bottom of FIG. 3 corresponds to the CBSD 102 communicating with the SAS 106 via the domain proxy 104.

In particular, for the direct communication, the CBSD 102 transmits a Feature Capability Exchange Request directly to the SAS 106. In response, the SAS 106 transmits a Feature Capability Exchange Response directly back to the CBSD 102. For the communication via the domain proxy 104, the CBSD 102 transmits the Feature Capability Exchange Request to the domain proxy 104, which then transmits the Feature Capability Exchange Request to the SAS 106. In response, the SAS 106 transmits the Feature Capability Exchange Response to the domain proxy 104, which then transmits the Feature Capability Exchange Response to the CBSD 102. Both of these implementations involve the definition of new information elements for existing request/response messages.

According to certain implementations, the Feature Capability Exchange Requests and Responses of FIG. 3 are based on the introduction of a new Feature Capability (WF_PAL_HANDLE_MOVE_LIST) in WINNF Release 2 (or higher) specifications for allowing a PAL CBSD to indicate its move-list handling preference. At the time of the CBSD pre-registration procedure, each PAL CBSD 102 indicates to the SAS 106 a preferred way of transmitting move-lists as a result of incumbent activity (or other triggers) using the new Feature Capability (WF_PAL_HANDLE_MOVE_LIST) with the cbsdFeatureCapabilityList information element (IE) (c.f. clause 6.2 of WINNF-TS-3002). Such preference enables a CBSD 102 to indicate the recipient of a subsequent move-list due to, e.g., incumbent detection. The indicated recipient may either be the CBSD 102 itself, a different CBSD 102, or a domain proxy, such as the domain proxy 104. Each CBSD 102 supporting this feature includes a preferred list of endpoints that are to receive move-lists on its behalf. In doing so, at minimum the following information is provided by each CBSD 102:

Type: Choice between (CBSD, Domain Proxy
IP address Type: Choice between {IPv4, IPv6}
IP address: A.B.C.D (for IPv4) or 128-bit address (for IPv6)

In one realization of inclusion of the above information, JSON key:value pair encoding/decoding rules may apply (c.f. clause 3 of WINNF-TS-3002 for dependent references).

Figure 4:
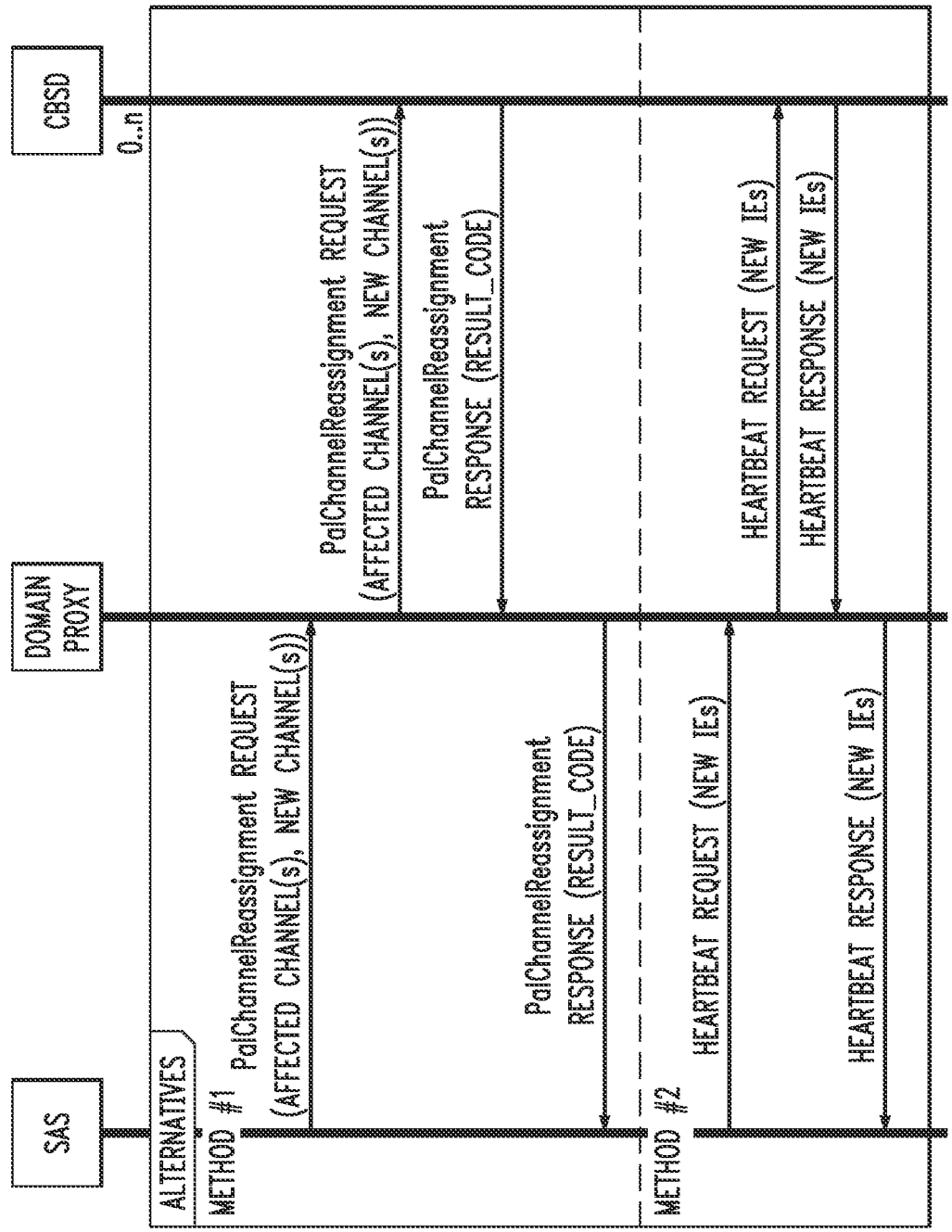
FIG. 4 shows two signal flow diagrams representing two different sequences of communications that can occur during the channel-move processing of Step 206 of FIG. 2 for one CBSD of FIG. 1, depending on the implementation of the present disclosure.

FIG. 4 shows two signal flow diagrams representing two different sequences of communications that can occur during the channel-move processing of Step 206 of FIG. 2 for one CBSD 102 of FIG. 1, depending on the implementation of the present disclosure. The signals at the top of FIG. 4 correspond to a first possible implementation of Step 206 for the CBSD 102 communicating with the SAS 106 via the domain proxy 104, while the signals at the bottom of FIG. 4 correspond to a second possible implementation of Step 206 for the CBSD 102 communicating with the SAS 106 via the domain proxy 104. Those skilled in the art will understand that there are two analogous different implementations for direct communications between the CBSD 102 and the SAS 106 that omit the intermediate transmissions of messages to and from the domain proxy 104.

In particular, for the first implementation, the SAS 106 transmits a PalChannelReassignment Request to the domain proxy 104, which then transmits the PalChannelReassignment Request to the CBSD 102. In response, the CBSD 102 transmits a PalChannelReassignment Response to the domain proxy 104, which then transmits the PalChannelReassignment Response to the SAS 106.

According to the first possible implementation in FIG. 4, the SAS 106 notifies the domain proxy 104 via a new message request/response pair (PalChannelReassignment Request/Response), where the message request/response pair includes at least the pair {affected channel(s), new channel(s)}, identifying the channel(s) to be moved away from (i.e., the affected channels) and the channel(s) to be moved to (i.e., the new channels).

For the second implementation of FIG. 3, the SAS 106 transmits a Heartbeat Request to the domain proxy 104, which then transmits the Heartbeat Request to the CBSD 102. In response, the CBSD 102 transmits a Heartbeat Response to the domain proxy 104, which then transmits the Heartbeat Response to the SAS 106.

Note that, in some implementations, when the domain proxy 104 receives responses (i.e., either PalChannelReassignment Response or Heartbeat Responses) from two or more different CBSDs 102, the domain proxy 104 will combine those multiple responses into a single, combined response that the domain proxy 104 will transmit to the SAS 106. In other implementations, the domain proxy 104 forwards individual responses to the SAS 106 without combining them. Note that, for Heartbeat Responses, the imminent expiration of the current heartbeat interval may limit the responses that can be combined to those that have been received in time to allow such combination in order to meet heartbeat timing requirements.

According to the second possible implementation in FIG. 4, new IEs are defined in the existing Heartbeat request/response procedure of clause 8.6 of WINNF-TS-0016. In particular, the IEs proposed for addition in the Heartbeat Response object (10.8.1 of WINNF-TS-0016) are shown in FIG. 5.

When the domain proxy 104 receives a move-list (i.e., notification of a PAL-channel move-out or move-in request) from the SAS 106, then the domain proxy 104 employs an algorithm for move-list notification to all of its dependent CBSDs/domain proxies that had pre-registered this domain proxy 104 to handle such a request on its behalf. Supported algorithms could include, but are not limited to, random draw, round-robin, first-in/first-out, and first-in/last-out. The domain proxy 104 executes the algorithm in notifying intended recipients (e.g., CBSDs 102(1) and 102(3)) of PAL-channel move-out or move-in requests.

The first implementation of FIG. 4 involves the definition of new request/response messages, while the second implementation, involve the definition of new information elements for existing request/response messages.

Upon reception of a PalChannelReassigment or Heartbeat Request either from the domain proxy 104 or from the SAS 106 directly, the CBSD 102 (a) ceases any ongoing transmissions on the affected channels, (b) indicates the same to its UE users of the affected channels, (c) indicates to its UE users the alternative channel(s) in which it intends to commence service operations (if such alternative channel(s) were identified by the SAS 106), and (d) notifies any CBSDs in its neighbor-relationship list of the same.

Steps (a)-(c) involve determination of radio resource control (RRC) modes of all UEs under the CBSD's control. For the RRC_CONNECTED mode, if an affected channel is a secondary cell (SCell), then the SCell change procedure is initiated for New Radio (NR)-only or Multi-RAT Dual Connectivity (c.f. [2], [3]). If the affected channel is a primary cell (PCell), then the Handover procedure is initiated for NR-only or MR-DC (c.f. [2], [3]). If the affected channel is primary/secondary cell (PSCell), then the PSCell change procedure is initiated for NR-only or MR-DC (c.f. [2], [3]).

For the RRC_INACTIVE mode, the CBSD 102 either (i) pages the identified UEs to change their RRC states to RRC_CONNECTED and execute the steps per the previous procedure for the RRC_CONNECTED mode or (ii) waits for a designated duration of time for any UEs in the RRC_INACTIVE state to contact the CBSD 102, at which time the steps per the previous procedure are executed.

For the RRC_IDLE mode, the CBSD 102 either (i) pages the identified UEs to change their RRC states to RRC_CONNECTED and execute steps per the previous procedure for the RRC_CONNECTED mode, (ii) waits for a designated duration of time for any UEs in RRC_IDLE state to contact the CBSD 102, at which time the steps per the previous procedure are executed, or (iii) waits for a designated duration of time for downlink (DL) data for such UEs to arrive at the CBSD 102, at which time the steps per the previous procedure are executed.

In Step (d), the CBSD 102 indicates via the Served Cells NR To Add IE (from the New Radio Absolute Radio-Frequency Channel Number (NR-ARFCN) included in palreassignment to the new channel to be employed) and Served Cells NR To Delete IE (from NR-ARFCN included in palreassignment to the affected channel in use) of the Xn-AP:NG-RAN NODE CONFIGURATION UPDATE message.

Although the disclosure has been described in the context of SASs and CBSDs for 5G CBRS radio systems, those skilled in the art will understand that the disclosure can be implemented for radio systems other than 5G CBRS radio systems, in which case, (i) the CBSDs 102 would be replaced by other types of (5G or non-5G) base stations and (ii) the SAS 106 would be replaced by an analogous (5G or non-5G) processors that assign channels to those base stations.

Although the disclosure has been described in the context of moving traffic, from one channel to another, due to the presence of an incumbent, in other implementations, traffic may be moved due to other reasons instead of or in addition to the presence of an incumbent.

Although the disclosure has been described in the context of moving PAL traffic, in general, the disclosure can be implemented in the context of (i) moving traffic from PAL channel(s) to GAA channel(s) and/or other PAL channel(s) and/or (ii) moving traffic from GAA channel(s) to PAL channel(s) and/or other GAA channel(s).

Although the disclosure describes the governing behavior in the context of exchange of certain information indicated in the capability exchange message, the inclusion and/or exchange of said information in message exchanges, during a given CBSD's registration context, subsequent to capability exchange is not precluded. For example, a CBSD 102 may register, with the SAS 106, the CBSD's preference for how to receive channel-change notifications. That same CBSD 102 may subsequently change that preference by re-registering with either the SAS 106 or one of the other SASs 110.

In certain embodiments, the present disclosure is a base station for a radio system having (i) a spectrum access system (SAS) configured to allocate channels to the base station and (ii) a domain proxy configured to be selectively used to receive and transmit messages between the base station and the SAS. The base station is configured to (i) transmit a capability exchange message to the SAS informing the SAS as to whether the SAS should transmit a channel-change message to the base station either (i) directly or (ii) via the domain proxy and (ii) subsequently execute the channel-change message received from the SAS either (i) directly or (ii) via the domain proxy per the capability exchange message.

In at least some of the above embodiments, the capability exchange message includes an explicit indication of whether the SAS should transmit the channel-change message to the base station either (i) directly or (ii) via the domain proxy.

In at least some of the above embodiments, the capability exchange message includes an implicit indication of whether the SAS should transmit the channel-change message to the base station either (i) directly or (ii) via the domain proxy, wherein (a) if the capability exchange message is transmitted to the SAS directly, then the implicit indication is that the SAS should transmit the channel-change message to the base station directly and (b) if the capability exchange message is transmitted to the SAS via the domain proxy, then the implicit indication is that the SAS should transmit the channel-change message to the base station via the domain proxy.

In at least some of the above embodiments, the radio system is a Citizens Broadband Radio System (CBRS) system, and the base station is a CBRS base station (CBSD).

In at least some of the above embodiments, the CBSD is operated by a Priority Access License (PAL) licensee, and the channel-change message is transmitted by the SAS and received by the CBSD to move PAL traffic due to presence of an incumbent.

In at least some of the above embodiments, if the CBSD is not assigned any PAL channels, then the CBSD does not transmit the capability exchange message to the SAS, in which case, the SAS will not transmit the channel-change message to the CBSD.

In at least some of the above embodiments, the channel-change request is a PAL Channel Reassignment Request.

In at least some of the above embodiments, the channel-change request is a Heartbeat Request.

In at least some of the above embodiments, the capability exchange message identifies an IP address type and an IP address for a recipient of the channel-change message transmitted by the SAS.

In at least some of the above embodiments, the base station uses specific information elements (IE) to notify one or more neighboring base stations of one or more alternative channels in which the base station intends to commence service operations.

In at least some of the above embodiments, the base station is configured to transmit a subsequent capability exchange message to the SAS or another SAS to change whether the SAS should transmit the channel-change message to the base station either (i) directly or (ii) via the domain proxy.

In certain embodiments, the present disclosure is a spectrum access system (SAS) for allocating channels to a base station in a radio system having a domain proxy configured to be selectively used to receive and transmit messages between the base station and the SAS, the SAS configured to (a) receive a capability exchange message from the base station informing the SAS as to whether the SAS should transmit a channel-change message to the base station either (i) directly or (ii) via the domain proxy and (b) subsequently transmit the channel-change message to the base station either (i) directly or (ii) via the domain proxy per the capability exchange message.

In at least some of the above embodiments, the capability exchange message includes an explicit indication of whether the SAS should transmit the channel-change message to the base station either (i) directly or (ii) via the domain proxy.

In at least some of the above embodiments, the capability exchange message includes an implicit indication of whether the SAS should transmit the channel-change message to the base station either (i) directly or (ii) via the domain proxy, wherein (a) if the capability exchange message is transmitted to the SAS directly, then the implicit indication is that the SAS should transmit the channel-change message to the base station directly and (b) if the capability exchange message is transmitted to the SAS via the domain proxy, then the implicit indication is that the SAS should transmit the channel-change message to the base station via the domain proxy.

In at least some of the above embodiments, the radio system is a 5G Citizens Broadband Radio System (CBRS) system, and the base station is a CBRS base station (CBSD).

In at least some of the above embodiments, the CBSD is operated by a Priority Access License (PAL) licensee, and the channel-change message is transmitted by the SAS and received by the CBSD to move PAL traffic due to presence of an incumbent.

In at least some of the above embodiments, the channel-change request is a PAL Channel Reassignment Request.

In at least some of the above embodiments, the channel-change request is a Heartbeat Request.

In at least some of the above embodiments, the capability exchange message identifies an IP address type and an IP address for a recipient of the channel-change message transmitted by the SAS.

In at least some of the above embodiments, if the channel-change message is to be sent to the base station via the domain proxy and if the SAS is to send an analogous channel-change message to another base station via the domain proxy, then the SAS is configured to transmit a single, combined channel-change message to the domain proxy, which then transmits individual channel-change messages to the base stations.

As will be appreciated by one of ordinary skill in the art, the present disclosure may be embodied as an apparatus (including, for example, a system, a machine, a device, a computer program product, and/or the like), as a method (including, for example, a business process, a computer-Implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A base station for a radio system having (i) a spectrum access system (SAS) configured to allocate channels to the base station and (ii) a domain proxy configured to be selectively used to receive and transmit messages between the base station and the SAS, the base station configured to:
    selectively receive and transmit the messages from and to the SAS either (i) directly or (ii) via the domain proxy;
    transmit a capability exchange message to the SAS informing the SAS as to whether the SAS should transmit a channel-change message to the base station either (i) directly or (ii) via the domain proxy, wherein the capability exchange message is transmitted to the SAS prior to the base station receiving the channel-change message from the SAS; and
    subsequently receive and execute the channel-change message received from the SAS either (i) directly or (ii) via the domain proxy per the capability exchange message.

2. The base station of claim 1, wherein the capability exchange message includes an explicit indication of whether the SAS should transmit the channel-change message to the base station either (i) directly or (ii) via the domain proxy.

3. The base station of claim 1, wherein the capability exchange message conveys an implicit indication and not an explicit indication of whether the SAS should transmit the channel-change message to the base station either (i) directly or (ii) via the domain proxy, wherein:
    in a first mode supported by the base station, the capability exchange message is transmitted to the SAS directly, and the implicit indication is that the SAS should transmit the channel-change message to the base station directly; and
    in a second mode supported by the base station, the capability exchange message is transmitted to the SAS via the domain proxy and the implicit indication is that the SAS should transmit the channel-change message to the base station via the domain proxy.

4. The base station of claim 1, wherein:
    the radio system is a Citizens Broadband Radio System (CBRS) system; and
    the base station is a CBRS base station (CBSD).

5. The base station of claim 4, wherein:
the CBSD is operated by a Priority Access License (PAL) licensee; and
the channel-change message is transmitted by the SAS and received by the CBSD to move PAL traffic due to presence of an incumbent.

6. The base station of claim 5, wherein, in case the CBSD is not assigned any PAL channels, the CBSD does not transmit the capability exchange message to the SAS, and the SAS does not transmit the channel-change message to the CBSD.

7. The base station of claim 4, wherein the channel-change request is a PAL Channel Reassignment Request.

8. The base station of claim 4, wherein the channel-change request is a Heartbeat Request.

9. The base station of claim 1, wherein the capability exchange message identifies an IP address type and an IP address for a recipient of the channel-change message transmitted by the SAS.

10. The base station of claim 1, wherein the base station uses specific information elements (IE) to notify one or more neighboring base stations of one or more alternative channels in which the base station intends to commence service operations.

11. The base station of claim 1, wherein the base station is configured to transmit a subsequent capability exchange message to the SAS or another SAS to change whether the SAS should transmit the channel-change message to the base station either (i) directly or (ii) via the domain proxy.

12. A spectrum access system (SAS) for allocating channels to a base station in a radio system having a domain proxy configured to be selectively used to receive and transmit messages between the base station and the SAS, the SAS configured to:
selectively receive and transmit the messages from and to the base station either (i) directly or (ii) via the domain proxy;
receive a capability exchange message from the base station informing the SAS as to whether the SAS should transmit a channel-change message to the base station either (i) directly or (ii) via the domain proxy, wherein the capability exchange message is received from the base station prior to the SAS transmitting the channel-change message to the base station; and
subsequently transmit the channel-change message to the base station either (i) directly or (ii) via the domain proxy per the capability exchange message.

13. The SAS of claim 12, wherein the capability exchange message includes an explicit indication of whether the SAS should transmit the channel-change message to the base station either (i) directly or (ii) via the domain proxy.

14. The SAS of claim 12, wherein the capability exchange message conveys an implicit indication and not an explicit indication of whether the SAS should transmit the channel-change message to the base station either (i) directly or (ii) via the domain proxy, wherein:
in a first mode supported by the SAS, the capability exchange message is transmitted to the SAS directly and the SAS infers that the implicit indication is that the SAS should transmit the channel-change message to the base station directly; and
in a second mode supported by the SAS, the capability exchange message is transmitted to the SAS via the domain proxy and the SAS infers that the implicit indication is that the SAS should transmit the channel-change message to the base station via the domain proxy.

15. The SAS of claim 13, wherein:
the radio system is a Citizens Broadband Radio System (CBRS) system; and
the base station is a CBRS base station (CBSD).

16. The SAS of claim 15, wherein:
the CBSD is operated by a Priority Access License (PAL) licensee; and
the channel-change message is transmitted by the SAS and received by the CBSD to move PAL traffic due to presence of an incumbent.

17. The SAS of claim 15, wherein the channel-change request is a PAL Channel Reassignment Request.

18. The SAS of claim 15, wherein the channel-change request is a Heartbeat Request.

19. The SAS of claim 12, wherein the capability exchange message identifies an IP address type and an IP address for a recipient of the channel-change message transmitted by the SAS.

20. The SAS of claim 12, wherein, in case the channel-change message is to be sent to the base station via the domain proxy and the SAS is to send an analogous channel-change message to another base station via the domain proxy, the SAS transmits a single, combined channel-change message to the domain proxy, which then transmits individual channel-change messages to the base stations.

21. The base station of claim 1, wherein the base station transmits the capability exchange message to the SAS prior to the SAS receiving notification of arrival of an incumbent warranting the channel-change message.

22. The SAS of claim 12, wherein the SAS receives the capability exchange message from the base station prior to the SAS receiving notification of arrival of an incumbent warranting the channel-change message.

23. A method for a base station for a radio system having (i) a spectrum access system (SAS) configured to allocate channels to the base station and (ii) a domain proxy configured to be selectively used to receive and transmit messages between the base station and the SAS, the method comprising the base station:
selectively receiving and transmitting the messages from and to the SAS either (i) directly or (ii) via the domain proxy;
transmitting a capability exchange message to the SAS informing the SAS as to whether the SAS should transmit a channel-change message to the base station either (i) directly or (ii) via the domain proxy, wherein the capability exchange message is transmitted to the SAS prior to the base station receiving the channel-change message from the SAS; and
subsequently receiving and executing the channel-change message received from the SAS either (i) directly or (ii) via the domain proxy per the capability exchange message.

24. A method for a spectrum access system (SAS) for allocating channels to a base station in a radio system having a domain proxy configured to be selectively used to receive and transmit messages between the base station and the SAS, the method comprising the SAS:
selectively receiving and transmitting the messages from and to the base station either (i) directly or (ii) via the domain proxy;
receiving a capability exchange message from the base station informing the SAS as to whether the SAS should transmit a channel-change message to the base station either (i) directly or (ii) via the domain proxy, wherein the capability exchange message is received from the base station prior to the SAS transmitting the channel-change message to the base station; and subsequently transmitting the channel-change message to the base station either (i) directly or (ii) via the domain proxy per the capability exchange message.

\* \* \* \* \*